(12) United States Patent
Hinterbichler et al.

(10) Patent No.: US 10,042,834 B2
(45) Date of Patent: Aug. 7, 2018

(54) DYNAMIC FIELD EXTRACTION OF DATA

(71) Applicant: VMware, Inc., Palo Alto, CA (US)

(72) Inventors: Erik Hinterbichler, Mountain View, CA (US); Chengdu Huang, Mountain View, CA (US); Zhenmin Li, San Jose, CA (US); Ron Oded Gery, Kirkland, WA (US)

(73) Assignee: VMware, Inc., Palo Alto, CA (US)

( * ) Notice: Subject to any disclaimer, the term of this patent is extended or adjusted under 35 U.S.C. 154(b) by 565 days.

(21) Appl. No.: 14/790,189

(22) Filed: Jul. 2, 2015

(65) Prior Publication Data
US 2015/0301996 A1   Oct. 22, 2015

Related U.S. Application Data

(63) Continuation of application No. 13/827,037, filed on Mar. 14, 2013, now Pat. No. 9,075,718.

(51) Int. Cl.
| | |
|---|---|
| *G06F 3/00* | (2006.01) |
| *G06F 17/24* | (2006.01) |
| *G06F 11/36* | (2006.01) |
| *G06F 11/07* | (2006.01) |
| *G06F 17/30* | (2006.01) |
| *G06F 3/0484* | (2013.01) |

(52) U.S. Cl.
CPC ........ *G06F 17/241* (2013.01); *G06F 11/0712* (2013.01); *G06F 11/0778* (2013.01); *G06F 11/3656* (2013.01); *G06F 17/30657* (2013.01); *G06F 17/30716* (2013.01); *G06F 3/0484* (2013.01)

(58) Field of Classification Search
CPC ...................................................... G06F 3/0484
USPC .................................................. 715/738, 739
See application file for complete search history.

(56) References Cited

U.S. PATENT DOCUMENTS

| | | | | |
|---|---|---|---|---|
| 7,836,439 | B2* | 11/2010 | Shenfield | G06F 9/44521 717/143 |
| 7,925,729 | B2* | 4/2011 | Bush | H04L 12/2807 709/223 |
| 8,239,754 | B1* | 8/2012 | Orthlieb | G06F 17/243 715/232 |
| 8,265,925 | B2* | 9/2012 | Aarskog | G06F 17/271 704/1 |
| 8,498,987 | B1* | 7/2013 | Zhou | G06F 17/30946 707/741 |
| 9,075,718 | B2* | 7/2015 | Hinterbichler | G06F 11/3656 |
| 9,460,074 | B2* | 10/2016 | Huang | G06F 17/2705 |
| 9,507,848 | B1* | 11/2016 | Li | G06F 17/30911 |
| 2007/0005535 | A1* | 1/2007 | Salahshour | G06F 9/542 706/20 |
| 2007/0220031 | A1* | 9/2007 | MacMahon | A63F 13/10 |

(Continued)

*Primary Examiner* — William Titcomb
(74) *Attorney, Agent, or Firm* — Patterson + Sheridan, LLP

(57) ABSTRACT

A log analytics graphical user interface enables a user to dynamically extract and define a field from unstructured log data. The log analytics module automatically determines a definition for a field based on log text selected by the user. A portion of each log message is highlighted to reflect what the extracted field may be to assist users with understanding if input parameters are selected the intended log data. Changes to the definition of the field, by the user, may cause further highlighting that to indicate an incomplete or erroneous field definition.

20 Claims, 8 Drawing Sheets

(56) References Cited

U.S. PATENT DOCUMENTS

| | | | |
|---|---|---|---|
| 2008/0127043 A1* | 5/2008 | Zhou | G06F 11/3604 717/104 |
| 2013/0117679 A1* | 5/2013 | Polis | H04L 67/00 715/738 |
| 2014/0282031 A1* | 9/2014 | Hinterbichler | G06F 11/3656 715/738 |

* cited by examiner

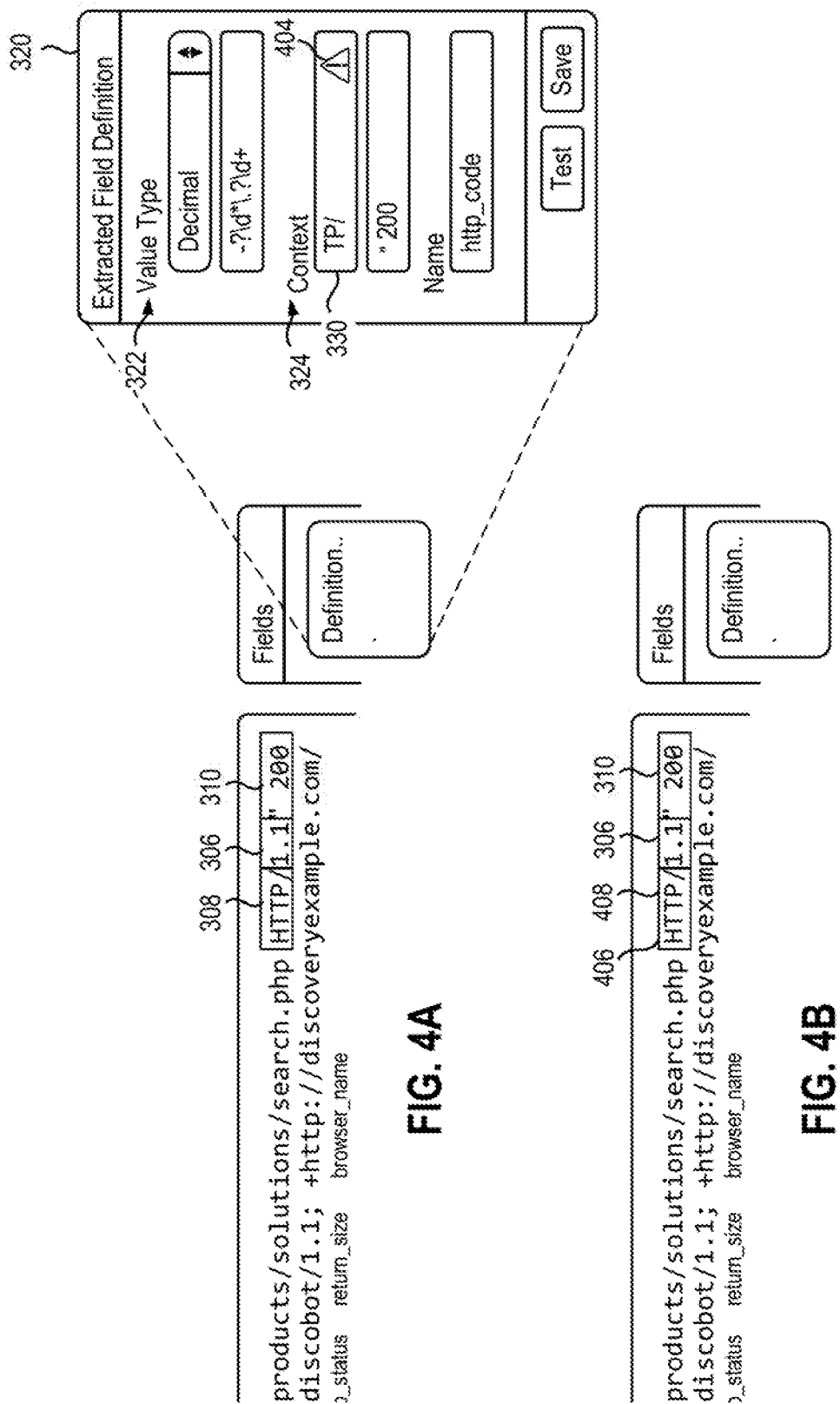

DYNAMIC FIELD EXTRACTION OF DATA

CROSS-REFERENCE TO RELATED APPLICATION(S)

This application is a continuation of prior U.S. application Ser. No. 13/827,037, filed Mar. 14, 2013, the entire contents of which are incorporated by reference herein.

BACKGROUND

System administrators provide virtualized computing infrastructure, which typically includes a plurality of virtual machines executing on a shared set of physical hardware components, to offer highly available, fault-tolerant distributed systems. However, a large-scale virtualized infrastructure may have many (e.g., thousands) of virtual machines running on many of physical machines. High availability requirements provide system administrators with little time to diagnose or bring down parts of infrastructure for maintenance. Fault-tolerant features ensure the virtualized computing infrastructure continues to operate when problems arise, but generates many intermediate states that have to be reconciled and addressed. As such, identifying, debugging, and resolving failures and performance issues for virtualized computing environments have become increasingly challenging.

Many software and hardware components generate log data to facilitate technical support and troubleshooting. However, over an entire virtualized computing infrastructure, massive amounts of unstructured log data can be generated continuously by every component of the virtualized computing infrastructure. As such, finding information within the log data that identifies problems of virtualized computing infrastructure is difficult, due to the overwhelming scale and volume of log data to be analyzed.

SUMMARY

One or more embodiments disclosed herein provide a method for displaying a graphical user interface for analyzing a plurality of log messages for a computing environment. The method includes displaying a plurality of log messages, including a first log message comprised of log text, and receiving an indication to extract a field based on a specified portion of log text of the first log message. The method further includes generating, by operation of one or more processing units, a definition of the extracted field having (1) a pattern that matches the specified portion of the log text, and (2) a context for the extracted field, wherein the context is determined based on the specified portion of the first log message. The method further includes annotating a first portion of the log text of the first log message which matches the pattern, and annotating a second portion of the log text of the first log message which matches the context.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

FIGS. 4A-4B depict screenshots of a user interface for modifying a definition of a field extracted from log data, according to one embodiment of the invention.

DETAILED DESCRIPTION

One or more embodiments disclosed herein provide methods, systems, and computer programs for displaying and analyzing log data for a computing infrastructure. In one embodiment, log data, sometimes referred to as runtime logs, error logs, debugging logs, event data, is displayed in a graphical user interface. A log analytics application may parse each entry of the log data to extract several statically-defined, pre-determined fields, such as a timestamp. However, due to the unstructured format of log data, there may be information within log data that a user, such as a system administrator, may wish to identify and extract from the log data for additional analysis. According to one embodiment, the user may select text, via user input, from the log data and dynamically extract a definition of a field from the selected text. The extracted field definition can be applied to the entirety of log data and be used similarly as statically-defined, pre-determined fields, for example, in use with searches, filters, charts, and statistical analysis.

Figure 1A:
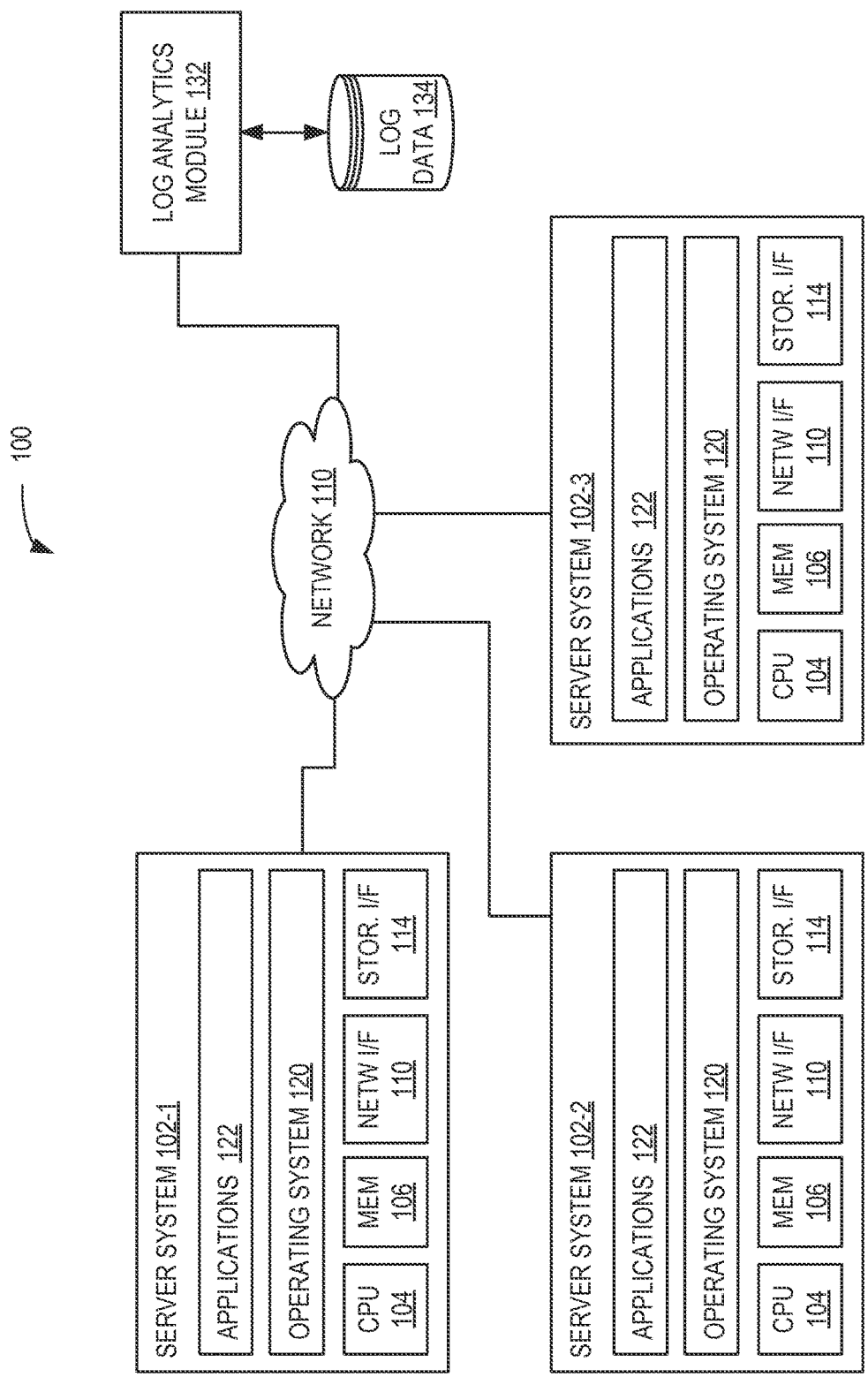
FIG. 1A depicts a block diagram that illustrates a computing system with which one or more embodiments of the present invention may be utilized.

FIG. 1A is a block diagram that illustrates a computing system 100 with which one or more embodiments of the present invention may be utilized. As illustrated, computing system 100 includes a plurality of server systems, identified as server system 102-1, 102-2, 102-3, and referred to collectively as servers 102. Each server 102 includes CPU 104, memory 106, networking interface 110, storage interface 114, and other conventional components of a computing device. Each server 102 further includes an operating system 120 configured to manage execution of one or more applications 122 using the computing resources (e.g., CPU 104, memory 106, networking interface 110, storage interface 114).

As mentioned earlier, software and infrastructure components of computing system 100 including servers 102, operating systems 120, and applications 122 running on top of operating system 120, may generate log data during operation. Log data may indicate the state, and state transitions, that occur during operation, and may record occurrences of failures, as well as unexpected and undesirable events. In one embodiment, log data may be unstructured text comprised of a plurality of log messages, including status updates, error messages, stack traces, and debugging messages. With thousands to millions of different processes running in a complex computing environment, an overwhelming large volume of heterogeneous log data, having varying syntax, structure, and even language, may be generated. While some information from log data may be parsed out according to pre-determined fields, such as time stamps, other information in the log messages may be relevant to the context of a particular issue, such as when troubleshooting or proactively identifying issues occurring in the computing system 100.

Accordingly, embodiments of the present invention provide a log analytics module 132 configured to store and analyze log data 134 from software and infrastructure components of computing system 100. In one embodiment, log analytics module 132 may be configured to perform lexical analysis on log data 134 to convert the sequence of characters of log text for each log message in log data 134 into a sequence of tokens (i.e., categorized strings of characters). As described later, log analytics module 132 may use lexical analysis to generate definitions for fields dynamically extracted from log text, and to provide instant visual feedback regarding changes to the definition for the extracted field.

Figure 2:
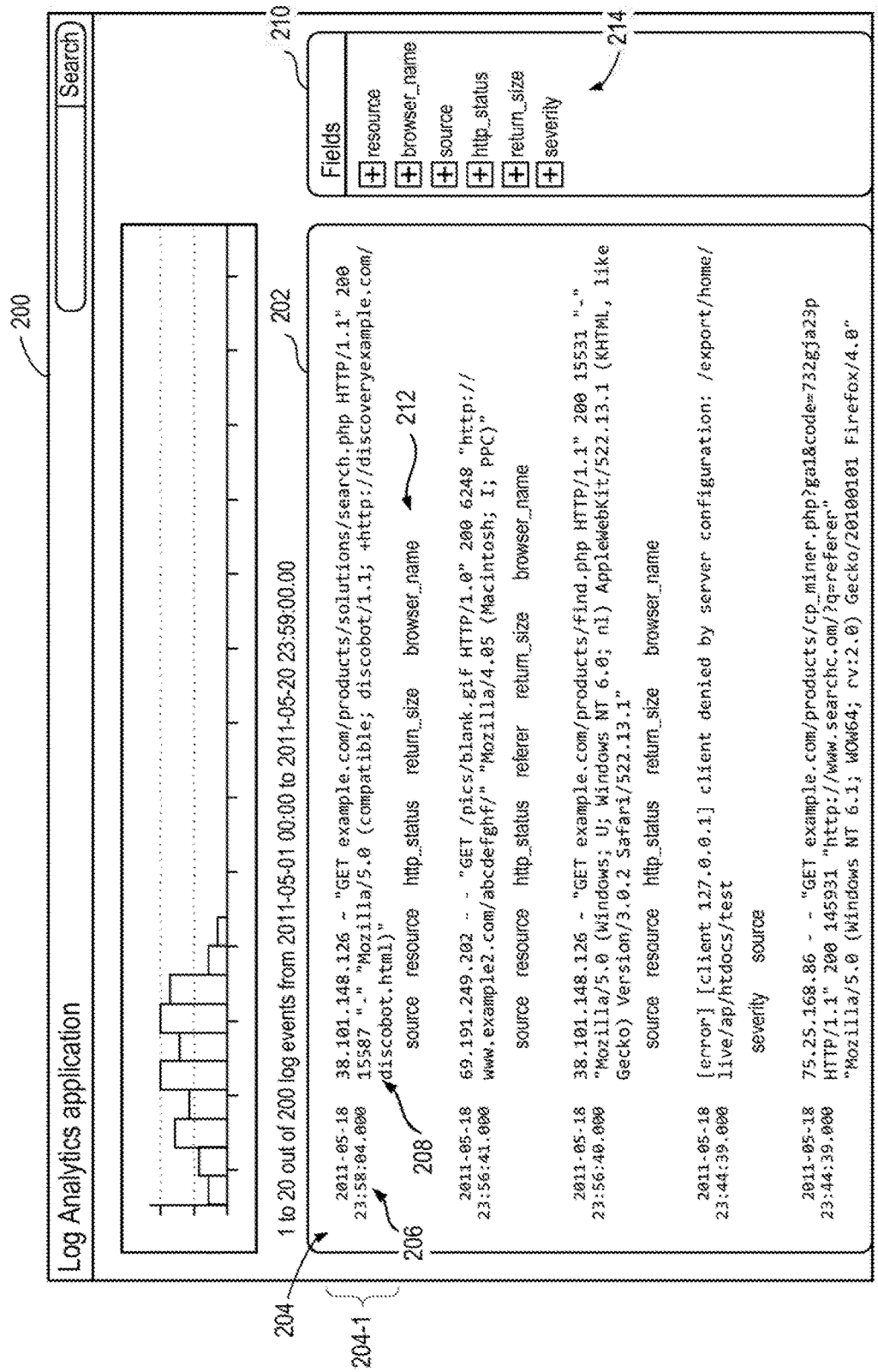
FIG. 2 depicts a screenshot of a user interface for viewing and analyzing log data, according to one embodiment of the invention.

According to some embodiments, users, such as system administrators, can access log analytics module 132 to access, process, and analyze log data 134 in an interactive visualization via the graphical user interface. The graphical user interface may be configured to enable the user to select text from log data 134 to dynamically define one or more fields based on the selected text. The graphical user interface may highlight portions of log data 134 based on the generated definition for the field. While the user edits the definition, the graphical user interface may dynamically highlight portions of log data 134 based on the changes to the definition to indicate the effects of the modified definition to the user. In some embodiments, the graphical user interface of log analytics module 132 may be configured to graphically suggest changes to the definition of an extracted field, for example, by highlighting portions of log data 134 that would be affected by a suggested change. Log analytics module 132 may store the definition of the extracted field, and apply the definition of the extracted field to other log messages in log data 134. One example of the graphical user interface of log analytics module 132 is shown in FIG. 2.

Figure 1B:
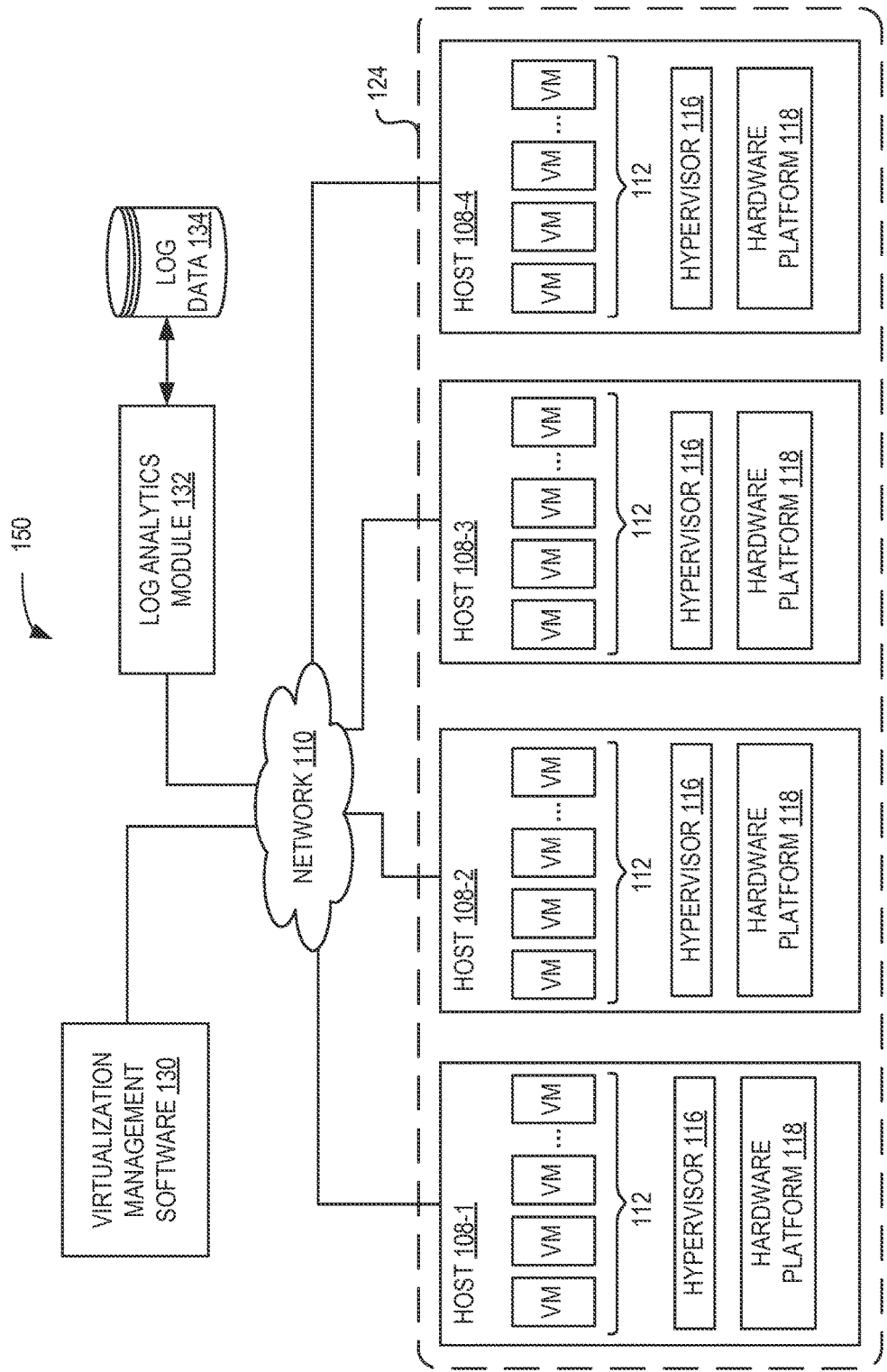
FIG. 1B depicts a block diagram that illustrates a virtualized computing system with which one or more embodiments of the present invention may be utilized.

While embodiments of the present invention are described in conjunction with a computing environment having physical components, it should be recognized that log data 134 may be generated by components of other alternative computing architectures, including a virtualized computing system as shown in FIG. 1B. FIG. 1B is a block diagram that illustrates a computing system 150 with which one or more embodiments of the present invention may be utilized. As illustrated, computing system 150 includes a host group 124 of host computers, identified as hosts 108-1, 108-2, 108-3, and 108-4, and referred to collectively as hosts 108. Each host 108 is configured to provide a virtualization layer that abstracts computing resources of a hardware platform 118 into multiple virtual machines (VMs) 112 that run concurrently on the same host 108. Hardware platform 118 of each host 108 may include conventional components of a computing device, such as a memory, processor, local storage, disk interface, and network interface. The VMs 112 run on top of a software interface layer, referred to herein as a hypervisor 116, that enables sharing of the hardware resources of host 108 by the virtual machines. One example of hypervisor 116 that may be used in an embodiment described herein is a VMware ESXi hypervisor provided as part of the VMware vSphere solution made commercially available from VMware, Inc. Hypervisor 116 may run on top of the operating system of host 108 or directly on hardware components of host 108. Each VM 112 includes a guest operating system (e.g., Microsoft Windows, Linux) and one or more guest applications and processes running on top of the guest operating system.

In the embodiment shown in FIG. 1B, computing system 150 includes a virtualization management software 130 that may communicate to the plurality of hosts 108 via network 110. Virtualization management software 130 is configured to carry out administrative tasks for the computing system 150, including managing hosts 108, managing VMs running within each host 108, provisioning VMs, migrating VMs from one host to another host, and load balancing between hosts 108 of host group 124. In one embodiment, virtualization management software 130 is a computer program that resides and executes in a central server, which may reside in computing system 150, or alternatively, running as a VM in one of hosts 108. One example of a virtualization management software is the vCenter® Server product made available from VMware, Inc. Similar to the software and infrastructure components of computing system 100, the software and infrastructure components of computing system 150, including, host group(s) 124, hosts 108, VMs 112 running on hosts 108, guest operating systems, applications, and processes running within VMs, may generate large amounts of log data during operation.

While log analytics module 132 is depicted in FIG. 1B as a separate component that resides and executes on a separate server or virtual machine, it is appreciated that log analytics module 132 may alternatively reside in any one of the computing devices of the virtualized computing system 150, for example, such as the same central server where the virtualization management software 130 resides. In one embodiment, log analytics module 132 may be embodied as a plug-in component configured to extend functionality of virtualization management software 130. Access to the log analytics module 132 can be achieved via a client application (not shown). For example, each analysis task, such as searching for log messages, filtering for log messages, analyzing log messages over a period of time, can be accomplished through the client application. One embodiment provides a stand-alone application version of the client application. In another embodiment, the client application is implemented as a web browser application that provides management access from any networked device.

FIG. 2 depicts a screenshot of a user interface 200 for managing log data of a computing system 100, according to various embodiments of the invention. The screenshot shown in FIG. 2 is an example of a user interface that is displayed in the log analytics module 132. As described in greater detail below, the user interface 200 includes a log area 202 and a fields area 210. Log area 202 displays a plurality of log messages 204 (including a first log message 204-1) generated over a period of time. In some embodiments, log area 202 may display one view of log messages 204 that constitute one page of log messages from a paginated set of log messages (i.e., "1 to 20 out of 200 log events"). Log area 202 may display one view of log messages 204 that satisfy a specified criteria or constraint. Log area 202 may display one view of log messages 204 in a specified order, such as by time, later first.

As shown in FIG. 2, user interface 200 includes a global fields area 210 that displays a list of fields 214 aggregated from all log messages shown in log area 202. In one embodiment, log area 202 includes a field label area 212, for each displayed log message 204, which represents a list of existing fields (e.g., "source," "resource," "http_status") that have been parsed from log text 208 of a particular log message.

In the embodiment shown, each of the plurality of log messages 204 includes a timestamp 206 (e.g., "2011-05-18 23:58:04.000") that indicates a date and time corresponding to the creation of the corresponding log message 204, and a text description, herein referred to as log text 208 (e.g., "38.101.148.126—GET 'example.com/products/solutions/search.php HTTP/1.1' 200 15587"). While each log message 204 is depicted as a separate line of text delimited by carriage returns for sake of illustration, it should be recognized that log messages 204 may be arranged in a variety of formats, including log messages that span several lines.

Figure 3A:
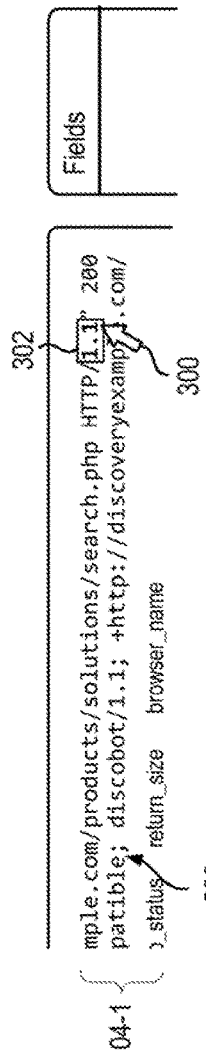
FIGS. 3A-3E depict screenshots of a user interface for dynamically extracting a field from log data, according to one embodiment of the invention.

FIGS. 3A-3E depict screenshots of a user interface for dynamically extracting a field from log data, according to one embodiment of the invention. The screenshots shown in FIGS. 3A-3D may be enlarged view of user interface 200 that is displayed in log analytics module 132 and depict a series of user interactions with user interface 200. According to one embodiment, a user interacting with user interface 200 of log analytics module 132 may select a portion of log text 208 from one of log messages 204 in log area 202. As shown in FIG. 3A, the user manipulates a cursor 300 to generate a selection of the text "1.1" from log message 204-1 (depicted as selected text 302), using known text manipulation techniques, including click-and-dragging a text caret, and double clicking on a word.

Figure 3B:
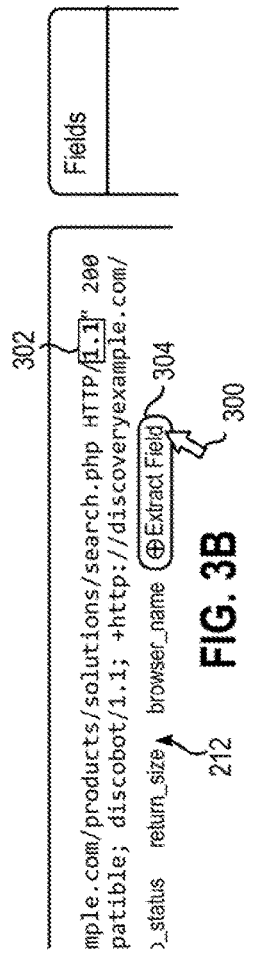

In response to a selection of log text from one of log messages 204, user interface 200 displays a graphical user interface element, such as a button, that enables the user to execute a process for dynamically extracting a field from selected text 302. As shown in FIG. 3B, responsive to selecting text 302, an "Extract Field" button 304 appears within field label area 212 to indicate to the user that a field, in addition to existing fields such as "return_size," "browser_name" already displayed in field label area 212, may be extracted using selected text 302. The user activates (e.g., click on) button 304 to dynamically extract a field from selected text 302. In response to activating button 304, log analytics module 132 automatically generates a definition of an extracted field based on selected text 302. As described in greater detail later, the definition of the extracted field may include at least a pattern that matches selected text 302 and may further include a context that matches text portions surrounding selected text 302. Parameters of the definition may be displayed to the user in a definition area 320 of the user interface 200, which is shown in greater detail in FIG. 3D, within fields area 210.

Figure 3C:
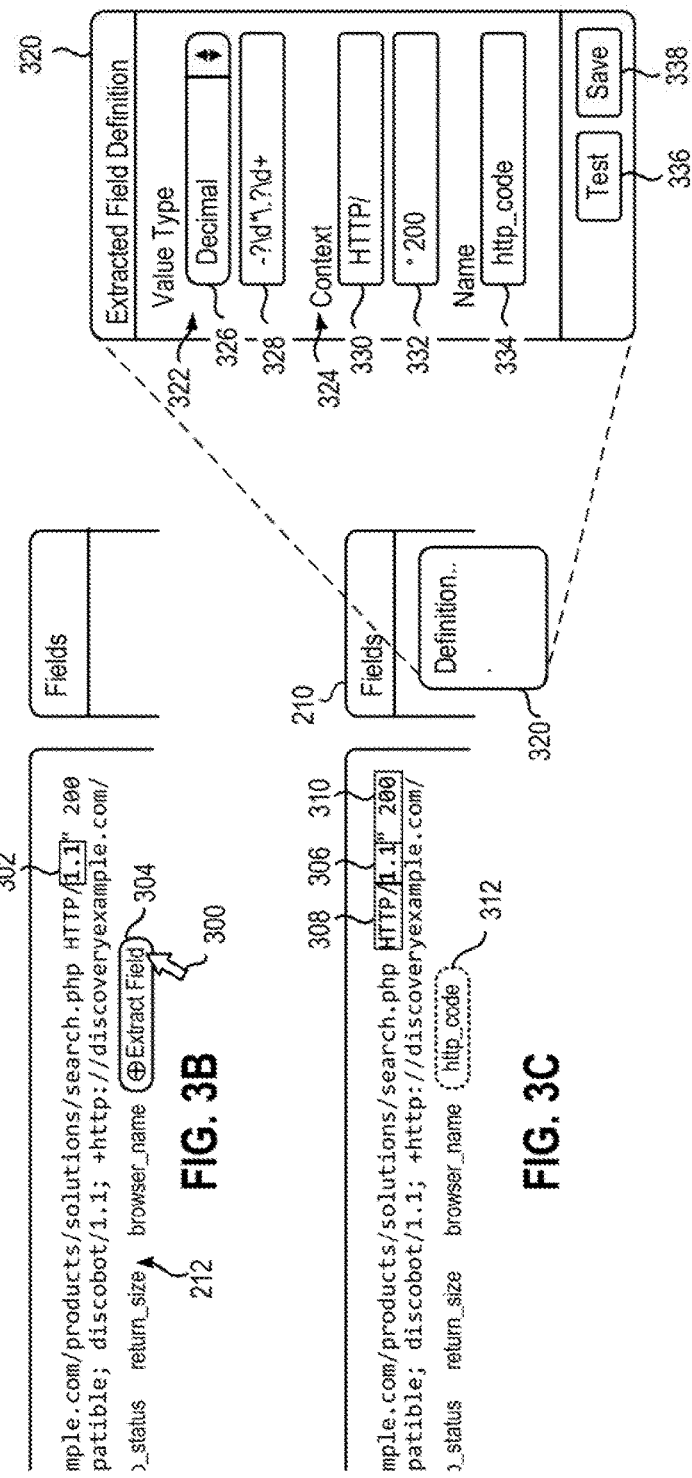

As shown in FIG. 3C, user interface 200 highlights a portion 306 of log text of log message 204-1 that corresponds to an instance of the extracted field that matches the pattern (e.g., "1.1"). User interface 200 further highlights portions 308, 310 of log text of log message 204-1 that match the context of the extracted field (e.g., "HTTP/" and ""200"). In the embodiment shown, highlighted portion 306 is rendered with a first background color representing the matched pattern and highlighted portions 308, 310 are rendered with a second background color different from the first background color (depicted as different textured portions). In some embodiments, the background colors may be selected such that the first background color has a different color saturation or intensity (e.g., greater color saturation, different intensity) than the second background color. For example, highlighted portion 306 corresponding to the instance of the extracted field may highlighted with a dark green, and highlighted portions 308, 310 corresponding to text that matches the context of the extracted field may be highlighted with a light green. While highlighted portions 306, 308, 310 are depicted as having highlighted backgrounds, it should be appreciated that "highlighting" text includes a variety of techniques for displaying and rendering text in a manner that graphically distinguishes the text from other text, including rendering text using particular background colors, background patterns, background textures, font colors, font styles such as bold-face, italics, underlines, borders, font families, font sizes, font animations, insertion of delimiting characters such as brackets, and any combination thereof.

Figure 3D:
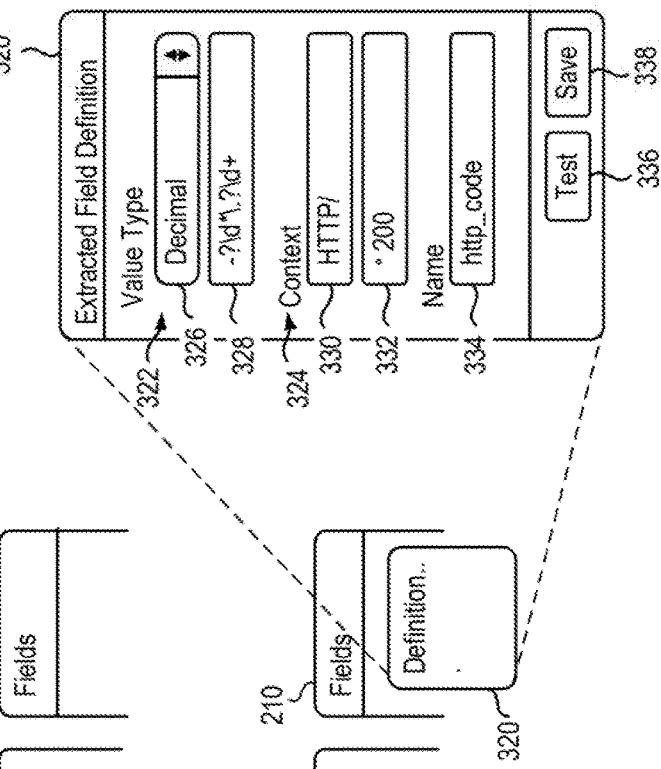

FIG. 3D depicts an enlarged view of definition area 320 that displays the parameters that define the extracted field, as initially determined by log analytics module 132. Definition area 320 includes input elements having the parameters that define the extracted field to enable the user to view, modify, test, and save changes to the definition of the extracted field. In the embodiment shown, definition area 320 includes a value-type element 322, a context element 324, a name element 334, a test button 336, and a save button 338.

Value-type element 322 indicates the pattern determined to match selected text 302. In one embodiment, value-type element 322 includes a value type list element 326 that provides a pre-determined list of value-types (e.g., "Decimal") that may be used for matching selected text 302 and a value type field element 328 that displays a pattern associated with the selected value-type (e.g., regular expression "-?\d*\.?\d+"). As described earlier, value type list element 326 and value type field element 328 may be user editable fields, such as a drop-down list or a text field, configured to enable the user to modify the value-type used for matching the extracted field. Examples of value-types that may be specified by value-type list element 326 include integer values, decimal values, hexadecimal values, values consisting of letters, digits, and underscores, Internet Protocol (IP) addresses v4 or v6, Media Access Control (MAC) addresses, currency values, values consisting of any character except whitespace, and a custom pattern (e.g., regular expression).

Context element 324 indicates the context determined to match text surrounding selected text 302. In one embodiment, the determined context associated with the extracted field may be comprised of string values, patterns, or regular expressions that match log text before and after selected text 302. As shown in FIG. 3D, context element 324 includes a "before" context input element 330 and an "after" context input element 332 that display the context before and the context after the selected text 302, respectively, as determined by log analytics module 132. As shown, before-context input element 330 and after-context input element 332 may be editable text fields configured to enable the user to modify and adjust the context of the extracted field initially determined by log analytics module 132.

In one embodiment, name element 334 may be a text field configured to receive text input from the user that specifies a name or label associated with the extracted field. As shown, user interface 200 may display the name 312 associated with the extracted field within field label area 212, for example, the "http_code" label shown in FIG. 3C.

Figure 3E:
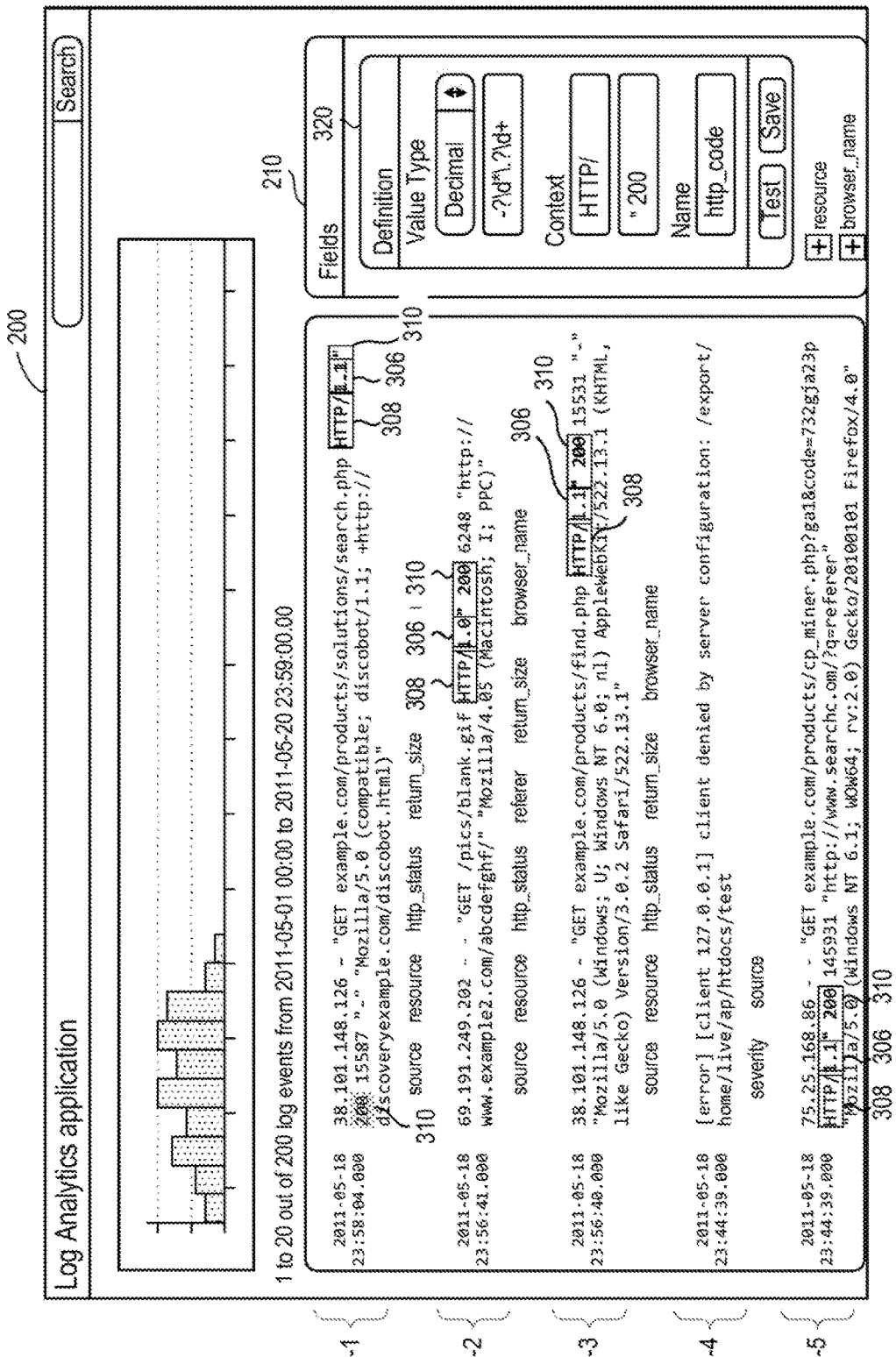

According to one embodiment, in addition to highlighting portions of log text from the same log message of which selected text 302 is a part (e.g., log message 204-1), user interface 200 may highlight other log messages (e.g., log messages 204-2 to 204-5) that also have instances of the extracted field, as shown in FIG. 3E. As shown, user interface 200 determines log messages 204-2, 204-3, 204-5 have instances of the extracted field http_code and highlights portions 306 of log text that matches the pattern associated with a decimal value-type and portions 308, 310 of log text that match the before-context "HTTP/" and the after-context ""200". For example, user interface 200 highlights portions 306 of log messages 204-2 and 204-5 that have the value "1.1" according to the definition of the extracted field. In another example, a portion 306 of log message 204-2 is highlighted even though log message 204-2 has a value (e.g., "1.0") for the extracted field http_code different than the selected text (e.g., "1.1") from which the definition is based, because the portion matches the definition of the extracted field. It should be appreciated that log analytics module 132 determines log message 204-4 does not contain an instance of the extracted field based on the determined definition and therefore does not highlight portions of log text of log message 204-4.

In some embodiments, the user may test the definition of the extracted field beyond those log messages displayed in the graphical user interface. As such, user interface 200 includes test button 336 which the user may press to re-run search results or filtering using the extracted field as a tentatively defined field. If satisfied, the user may press save button 338 of user interface 200 to save the definition of the extracted field.

FIGS. 4A-4B depict screenshots of a user interface for modifying a definition of a field extracted from log data, according to one embodiment of the invention. The screenshots shown in FIGS. 4A-4B may be enlarged view of user interface 200 that is displayed in log analytics module 132 and depict a series of user interactions with user interface 200. According to one embodiment, the user interacting with user interface 200 of log analytics module 132 may modify the definition of the extracted field using definition area 320. For example, the user may change the value-type specified by value-type element 322 or edit the text fields of context element 324. In the example shown in FIG. 4A, the user edits the before-context specified by before-context input element 330 (e.g., by editing the text value therein) by deleting the characters "HT" from the existing before-context "HTTP/".

In one embodiment, as the user makes changes to context element 324, user interface 200 actively modifies the highlighted log text of log messages 204 based on the changes. User interface 200 highlights portions of log text in a manner that indicates to the user that the modified context incompletely matches existing instances of the extracted field. As shown in FIG. 4B, user interface 200 highlights a portion 408 of log text of one or more log messages (e.g., log messages 204-1) that matches the modified context and further highlights another portion 406 of log text that constitutes a remainder of a text token parsed by log analytics module 132. For example, when the user modifies the before-context to be the match string "TP/," user interface 200 highlights portion 408 (e.g., with one background color, such as red), and highlights portion 406 as the remainder of the text token (i.e., "HT") differently (e.g., with another background color, such as light pink). In one embodiment, user interface 200 may present an alert indication, such as icon 404 within the text field of context input element 330, which indicates to the user that the modified context does not match a full token in at least some log messages, and directs the user to complete the token as suggested by the highlighting shown in FIG. 3E.

Figure 5:
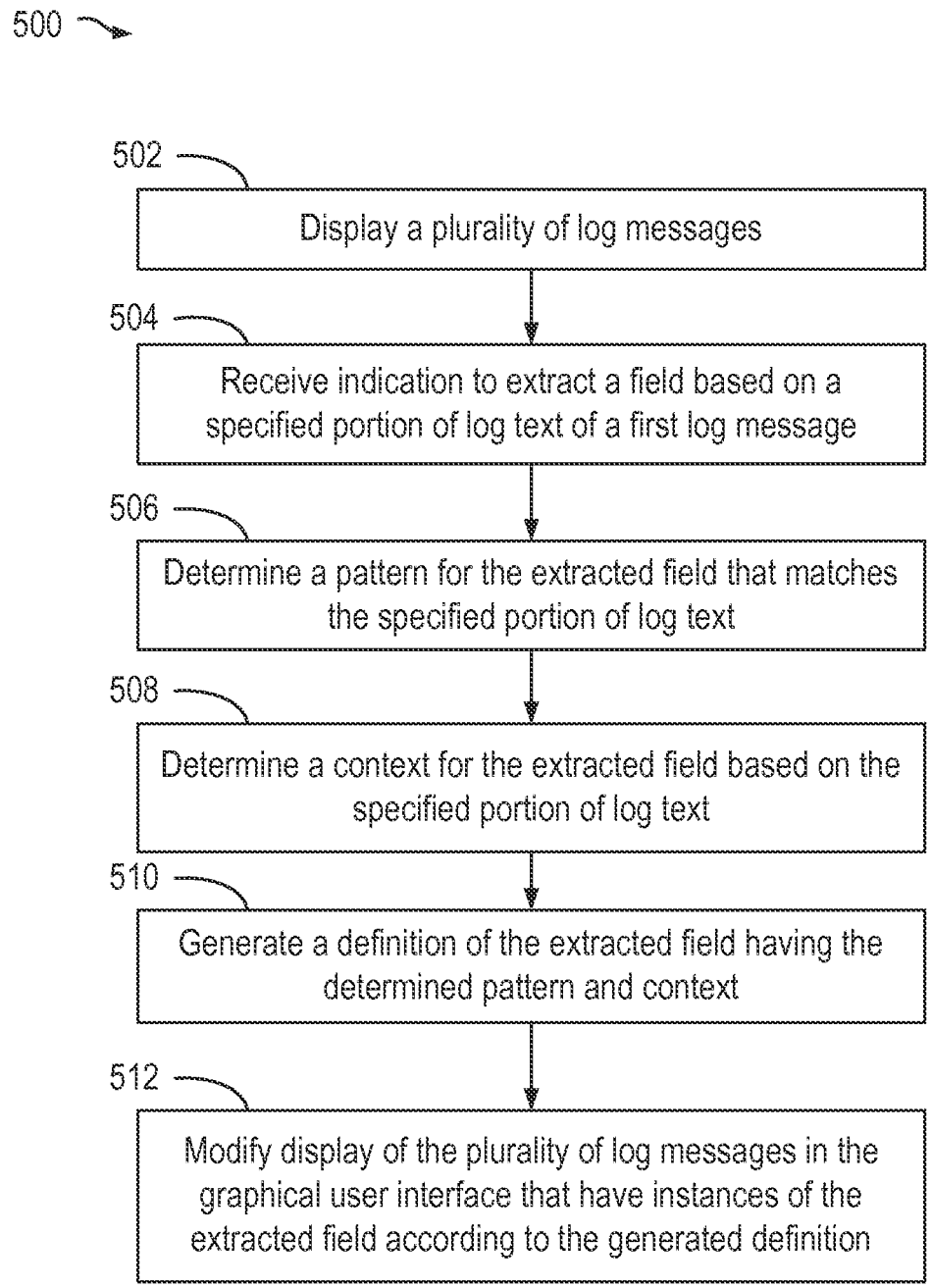
FIG. 5 is a flow diagram that illustrates steps for a method for providing a user interface for analyzing log messages for a computer infrastructure, according to an embodiment of the present invention.

FIG. 5 is a flow diagram that illustrates steps for a method 500 for providing a user interface for analyzing log messages for a computer infrastructure, according to an embodiment of the present invention. It should be recognized that, even though the method 500 is described in conjunction with the system of FIGS. 1A-1B, any system configured to perform the method steps is within the scope of embodiments of the invention.

The method 500 begins at step 502, where log analytics module 132 displays, in a graphical user interface, a plurality of log messages 204 from log data 134 generated by software and infrastructure components of computing system 100. In one embodiment, log analytics module 132 receives a stream of log data 134 generated by software and infrastructure components of computing system 100. In other embodiments, log analytics module 132 may be configured to retrieve log data (e.g., log files) from software and infrastructure components of virtualized computing system 150, including hypervisors 116, guest application and operating systems running within VMs 112. In some embodiments, software and infrastructure components of computing system 100 may be configured to write log files to a common destination, such as an external storage, from which log analytics module 132 may periodically retrieve log data. In another embodiment, log data 134 may be imported by a user (e.g., system administrator) into log analytics module 132 using one or more file transfer methods.

At step 504, log analytics module 132 receives an indication, via user input, to extract a field based on a specified portion of log text of a first log message of the plurality of log messages shown in the graphical user interface. In one embodiment, the graphical user interface of the log analytics module 132 detects a text selection (e.g., blocking) of log text in the first log message and dynamically reveals a button (e.g., "Extract field") responsive to the text selection. In some embodiments, the received indication may specify a string of the selected log text. In other embodiments, the received indication may specify a position identifier locating the text selection within the string (e.g., string index 15 to 20), which log analytics module 132 may use to parse a substring of the selected log text.

At step 506, responsive to receiving the indication to extract a field, log analytics module 132 determines a pattern for the extracted field that matches the specified portion of log text. In one embodiment, log analytics module 132 determines whether the specified log text matches a type of value (or "value-type") based on a pre-determined list of patterns (e.g., regular expressions). The list of patterns may be generated based on common value-types found in log messages. For example, the list of patterns may include a regular expression that matches an integer value (e.g., "-?\d+"), a regular expression that matches decimal values (e.g., "-?\d*\.?\d+"), regular expressions that match hexadecimal values, regular expressions that matches IP addresses (e.g., "\d{1,3}\.\d{1,3}\.\d{1,3}\.\d{1,3}"), regular expressions that match values consisting of letters, digits, and underscores, regular expressions that match currency values, regular expressions that match values consisting of any character except whitespace, etc. In some embodiments, the list of patterns may have an order or priority, for example, based on specificity or frequency of occurrence. Log analytics module 132 iterates through the pre-determined list of patterns until one of the patterns matches the specified log text. In some embodiments, if log analytics module 132 is unable to find a match to a value-type, log analytics module 132 may then default to a pattern of any characters (e.g., "*"), thereby relying on the context of the extracted field to identify instances of the field.

At step 508, log analytics module 132 determines a context for the extracted field based on the specified log text in the first log message. In one embodiment, log analytics module 132 determines a context before and after for the extracted field based on text before and after the specified log text. In one implementation, log analytics module 132 performs lexical analysis on the entire log text of the first log message to determine tokens before and after the specified log text. For example, log analytics module 132 may send log text and a position of the specified log text to a lexical component, referred to as a tokenizer, which is configured to break up the log text into a plurality of tokens according to one or more heuristics (e.g., tokens are separated by whitespace characters; contiguous strings of alphanumeric characters constitute a token; tokens are separate by punctuation characters within certain contexts). The tokenizer processes the log text and returns back tokens comprised of log text that are before and after the specified position of log text.

In some embodiments, log analytics module 132 may determine the context for the extracted field to be the literal string of characters of the tokens before and after the specified log text, for example, the literal string "HTTP/". In some embodiments, log analytics module 132 may generalize the context of the extracted field from before- and after-tokens into patterns or regular expressions. In one implementation, log analytics module 132 may choose a generalization, for example, by running the before and after tokens through the pre-determined list of patterns, similar to a process described at step 506 earlier, and testing the generalization with similar log messages displayed by log analytics module 132 to verify the generalization matches common contexts.

At step 510, log analytics module 132 generates a definition of the extracted field having the determined pattern and context. In some embodiments, log analytics module 132 may save the definition for later use by an individual user or for a plurality of users accessing log analytics module 132. In some embodiments, log analytics module 132 may assign a name to the extracted field (e.g., "http_code") or receive a name via user input for the extracted field.

At step 512, log analytics module 132 modifies display of the plurality of log messages, including the first log message, in the graphical user interface which have instances of the extracted field according to the generated definition. A particular log message may be deemed to have an instance of the extracted field if the log message satisfies the pattern and the context of the extracted field. In one embodiment, log analytics module 132 annotates a first portion of log text of at least one log message that matches the pattern, and annotates a second portion of the log text that matches the context. For example, log analytics module 132 applies text highlighting to log text that matches the pattern of extracted field and applies additional text highlighting to log text that matches the context of the extracted field. In embodiments where log analytics module 132 is a web application, log analytics module 132 provides live, client-side highlighting of log text in the graphical user interface, for example, using JavaScript, HTML5, or other client-side technologies, to apply the regular expressions of the extracted field to the plurality of log messages. Embodiments of the invention provide highlighting of log messages for visual feedback to the user of the accuracy and precision of the extracted field.

Figure 6:
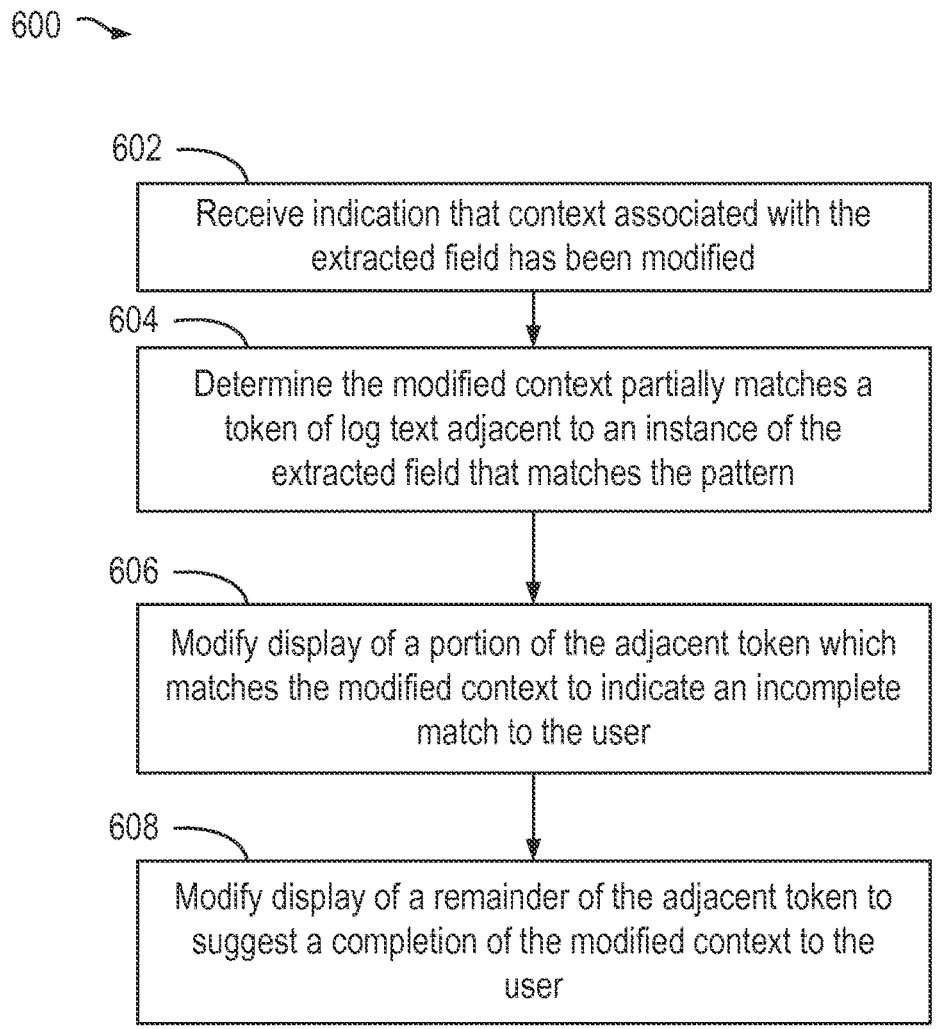
FIG. 6 is a flow diagram that illustrates steps for a method for providing a user interface for modifying a definition of an extracted field from log messages, according to an embodiment of the present invention.

FIG. 6 is a flow diagram that illustrates steps for a method 600 for providing a user interface for modifying a definition of an extracted field from log messages, according to an embodiment of the present invention. It should be recognized that, even though the method 600 is described in conjunction with the system of FIGS. 1A-1B, any system configured to perform the method steps is within the scope of embodiments of the invention. The method 600 begins at step 602, where log analytics module 132 receives, via user input, an indication that the context associated with the extracted field has been modified. In one embodiment, the user interface of log analytics module 132 may detect changes to a before-context or after-context associated with the extracted field as the user interacts with the user interface (e.g., by typing new characters, deleting existing characters).

At step 604, log analytics module 132 determines whether the modified context partially matches a token of log text adjacent to an instance of the extracted field in one or more of the log messages displayed in the graphical user interface. For example, log analytics module 132 may determine a modified before-context matches some, but not all, of the token before the instance of the extracted field. If the modified context matches the entirety of the token of log text adjacent to an instance of the extracted field, log analytics module 132 may continue to highlight portions of log text as described in method 500 above. If the modified context matches none of the token of log text adjacent to an instance of the extracted field, log analytics module 132 may remove highlighting from portions of log text to indicate to the user that the modified context no longer matches portions of the plurality of log messages.

At step 606, responsive to determining the modified context partially matches an adjacent token, log analytics module 132 modifies display of a portion of the adjacent token by annotating the portion which matches the modified context to indicate an incomplete match to the user. In the example shown in FIG. 4B, log analytics module 132 may determine the token adjacent to the specified log text "1.1", the token containing the log text "HTTP/", partially matches the new before-context "TP/". As such, log analytics module 132 highlights the portion "TP/" (as depicted by textured portion 408) to indicate to the user that only part of the token matches the new before-context "TP/".

In one embodiment, log analytics module 132 highlights the matching portion of the token using a first warning color. In some embodiments, the first warning color may be different than colors used for highlighting as described in steps 510 and 512 earlier. For example, a matched value may be highlighted in dark green, matched context may be highlighted in light green, and partially matched context may be highlighted in red.

At step 608, log analytics module 132 further modifies display of a remainder of the token adjacent to the instance of the extracted field by annotating the remaining portion of the token to suggest a completion of the modified context to the user. In the example shown in FIG. 4B, log analytics module 132 highlights the remainder of the token "HTTP/" which does not match the modified context (i.e., highlights the log text "HT") to suggest, to the user, that adding "HT" to the before-context "TP/" would complete a pattern that matches that adjacent token in the first log message 204-1.

In one embodiment, log analytics module 132 highlights the remainder of the adjacent token using a second warning color, the second warning color being different than the first warning color. The log analytics module 132 displays the remainder of the token using the second warning color to indicate to the user how to complete the token as suggested by the highlighting (e.g., by typing in the remainder of the token in the before context text field). In some embodiments, the first warning color may be different from the second warning color. For example, the warning colors may be selected such that the first warning color has greater color saturation or different color intensity than the second warning color. Specifically, the partially matched context may be highlighted in red, and the remainder of the token may be highlighted in light pink.

Accordingly, embodiments of the present invention provide a technique for dynamically extracting fields from unstructured log data generated by many software and infrastructure components of a computer system 100. In contrast to conventional approaches, embodiments described herein advantageously reduces the need for users to learn complex, technical programming to specify fields found within log data. Embodiments of the invention provide live highlighting which changes highlighting of log text while the user is typing, thereby assisting the user in understanding if their field parameters are selecting the log data the user intends to select.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for displaying a graphical user interface for analyzing unstructured data, the method comprising:
displaying a plurality of items of unstructured data, including a first item of unstructured data comprised of text;
receiving an indication to extract a field based on a specified portion of text of the first item;
generating, by operation of one or more processing units, a definition of the extracted field having (1) a pattern that matches the specified portion of the text, and (2) a context for the extracted field, wherein the context is determined based on the specified portion of the first item;
annotating a first portion of the text of the first item which matches the pattern; and
annotating a second portion of the text of the first item which matches the context.

2. The method of claim 1, wherein receiving the indication to extract the field based on the specified portion of text of the first item further comprises receiving a text selection, from a user via the graphical user interface, which indicates the specified portion of text.

3. The method of claim 1, wherein the pattern associated with the definition of the extracted field is a value type determined based on a match from a pre-determined list of regular expressions.

4. The method of claim 1, wherein the context associated with the definition of the extracted field comprises a before pattern that matches a token of text before an instance of the extracted field and an after pattern that matches a token of text after the instance of the extracted field.

5. The method of claim 1, wherein annotating of the first and second portions of the text of the first item comprises:
highlighting the first portion of the text using a first color; and
highlighting the second portion of the text using a second color, wherein the first color has different color intensity than the second color.

6. The method of claim 1, further comprising:
annotating the plurality of items of unstructured data in the graphical user interface, such that for each of the plurality of items of unstructured data having an instance of the extracted field that satisfies the generated definition:

annotating a first portion of the item to indicate a match with the pattern of the extracted field associated with the item; and annotating a second portion of the item, the second portion which matches with the context for the extracted field.

7. The method of claim 1, further comprising:
receiving an indication that the context associated with the extracted field has been modified;
annotating the second portion of the first item to indicate an incomplete match with the modified context.

8. The method of claim 7, wherein the annotating the second portion to indicate the incomplete match with the modified context further comprises:
determining the modified context partially matches a token of text adjacent to an instance of the extracted field that matches the pattern;
highlighting a portion of the token that matches the modified context with a first color; and
highlighting a remainder of the token with a second color, wherein the first color has a different color intensity than the second color.

9. A non-transitory computer readable storage medium having stored thereon computer software executable by a processor, the computer software embodying a method for displaying a graphical user interface for analyzing unstructured data, the method comprising:
displaying a plurality of items of unstructured data, including a first item of unstructured data comprised of text;
receiving an indication to extract a field based on a specified portion of text of the first item;
generating a definition of the extracted field having (1) a pattern that matches the specified portion of the text, and (2) a context for the extracted field, wherein the context is determined based on the specified portion of the first item;
annotating a first portion of the text of the first item which matches the pattern; and
annotating a second portion of the text of the first item which matches the context.

10. The non-transitory computer readable storage medium of claim 9, wherein receiving the indication to extract the field based on the specified portion of text further comprises:
receiving a text selection, from a user via the graphical user interface, which indicates the specified portion of text.

11. The non-transitory computer readable storage medium of claim 9, wherein the pattern associated with the definition of the extracted field is a value type determined based on a match from a pre-determined list of regular expressions.

12. The non-transitory computer readable storage medium of claim 9, wherein the context associated with the definition of the extracted field comprises a before pattern that matches a token of text before an instance of the extracted field and an after pattern that matches a token of text after the instance of the extracted field.

13. The non-transitory computer readable storage medium of claim 9, wherein annotating display of the first and second portions of text of the first item comprises:
annotating the first portion of the text using a first color; and
annotating the second portion of the text using a second color, wherein the first color has different color intensity than the second color.

14. The non-transitory computer readable storage medium of claim 9, further comprising:
annotating the plurality of items of unstructured data in the graphical user interface:
for each of the plurality of items of unstructured data having an instance of the extracted field that satisfies the generated definition, annotating a first portion of the item to indicate a match with the pattern of the extracted field associated with the item and annotating a second portion of the item which matches the context for the extracted field.

15. The non-transitory computer readable storage medium of claim 9, further comprising:
receiving an indication that the context associated with the extracted field has been modified; and
annotating the second portion of the first item to indicate an incomplete match with the modified context.

16. The non-transitory computer readable storage medium of claim 15, wherein annotating the second portion to indicate the incomplete match with the modified context further comprises:
determining the modified context partially matches a token of text adjacent to an instance of the extracted field that matches the pattern;
annotating a portion of the token that matches the modified context with a first color; and
annotating a remainder of the token with a second color, wherein the first color has a different color intensity than the second color.

17. A computer system for displaying a graphical user interface for analyzing unstructured data for a computing environment, the computer system comprising:
a system memory;
a storage device having a plurality of items of unstructured data including a first item of unstructured data comprised of text; and
a processor programmed to carry out the steps of:
displaying the plurality of items of unstructured data;
receiving an indication to extract a field based on a specified portion of text of the first item;
generating a definition of the extracted field having (1) a pattern that matches the specified portion of the text, and (2) a context for the extracted field, wherein the context is determined based on the specified portion of the first item;
modifying display of a first portion of the text of the first item which matches the pattern; and
modifying display of a second portion of the text of the first item which matches the context.

18. The computer system of claim 17, wherein the context associated with the definition of the extracted field comprises a before pattern that matches a token of text before an instance of the extracted field and an after pattern that matches a token of text after the instance of the extracted field.

19. The computer system of claim 17, wherein the processor programmed to carry out the step of annotating the first and second portions of text of the first item is further programmed to carry out the steps of:
annotating the first portion of the text using a first color; and
annotating the second portion of the text using a second color, wherein the first color has different color intensity than the second color.

20. The computer system of claim 17, wherein the processor is further programmed to carry out the steps of:
annotating the plurality of items of unstructured data in the graphical user interface, such that for each of the plurality of items of unstructured data having an instance of the extracted field that satisfies the generated definition:

annotating a first portion of the item to indicate a match with the pattern of the extracted field associated with the item; and annotating a second portion of the item, the second portion which matches with the context for the extracted field.

\* \* \* \* \*